(12) United States Patent
Kreuzer

(10) Patent No.: US 7,007,974 B2
(45) Date of Patent: Mar. 7, 2006

(54) AIRBAG FOR A RESTRAINT SYSTEM IN MOTOR VEHICLES

(75) Inventor: Martin Kreuzer, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 101 days.

(21) Appl. No.: 10/262,021

(22) Filed: Oct. 1, 2002

(65) Prior Publication Data
US 2003/0067150 A1 Apr. 10, 2003

(30) Foreign Application Priority Data
Oct. 2, 2001 (DE) ................. 101 48 634

(51) Int. Cl.
*B60R 21/16* (2006.01)
(52) U.S. Cl. ................. 280/743.1
(58) Field of Classification Search ........... 280/743.1, 280/730.1, 730.2
See application file for complete search history.

(56) References Cited

U.S. PATENT DOCUMENTS

| | | | |
|---|---|---|---|
| 4,357,387 A * | 11/1982 | George et al. ........... 442/71 |
| 4,657,807 A | 4/1987 | Fuerstman | |
| 4,728,564 A * | 3/1988 | Akagi et al. ........... 442/164 |
| 4,817,853 A * | 4/1989 | Scanlon et al. ........... 228/121 |
| 5,599,585 A | 2/1997 | Cohen | |
| 6,209,482 B1 * | 4/2001 | Doehler ........... 118/723 MW |
| 6,245,695 B1 * | 6/2001 | Maruo et al. ........... 442/136 |
| 6,328,334 B1 * | 12/2001 | Kanuma ........... 280/730.2 |
| 6,548,121 B1 * | 4/2003 | Bauer et al. ........... 427/509 |

FOREIGN PATENT DOCUMENTS

| | | |
|---|---|---|
| CN | 1145426 | 3/1997 |
| DE | 3436097 A1 | 5/1985 |
| DE | 19823203 A1 | 12/1999 |
| GB | 2354745 | 4/2001 |
| JP | 61146869 A | 7/1986 |
| JP | 61186569 A | 8/1986 |
| JP | 01174442 A | 7/1989 |
| JP | 05213137 A | 8/1993 |
| JP | 05338092 A | 12/1993 |
| JP | 06228881 A | 8/1994 |
| JP | 06-305089 | 11/1994 |
| JP | 06305089 A | 11/1994 |
| JP | 07171923 A | 7/1995 |
| JP | 001163166 A | 6/2001 |
| WO | WO 98/30748 | 7/1998 |

OTHER PUBLICATIONS

Derwert Database Abstract No. XP002178601.
Derwert Database Abstract No. XP002248418.
Derwert Database Abstract No. XP002178602.

* cited by examiner

*Primary Examiner*—Faye M. Fleming
(74) *Attorney, Agent, or Firm*—Tarolli, Sundheim, Covell & Tummino L.L.P.

(57) ABSTRACT

An airbag for a restraint system in motor vehicles comprises a wall made of fabric. One surface of the fabric is subjected to a plasma treatment in order to increase the heat resistance of the fabric. There is also proposed a method of producing such airbag and a method of inflating it.

10 Claims, 1 Drawing Sheet

AIRBAG FOR A RESTRAINT SYSTEM IN MOTOR VEHICLES

TECHNICAL FIELD

The present invention relates to an airbag for a restraint system in vehicles, a means to protect vehicle occupants with such an airbag, and a method of producing such airbag as well as a method of inflating it.

BACKGROUND OF THE INVENTION

Airbags for vehicle occupant restraint systems are normally made of silicone-coated or uncoated polyamide or polyester fabrics. The fabrics have to allow a specific adjustment of the air permeability and moreover, they have to be heat-resistant. Furthermore, the fabric should fold well and have the smallest possible mass since there is an interest for the airbag to occupy as little space as possible in the vehicle.

It has already been proposed to provide the inside of the airbags with heat-absorbing means such as, for example, a film coating or other sacrificial materials. These sacrificial materials are melted or degraded by the hot gases flowing into the airbag and, in this manner, are supposed to protect the actual airbag wall from damage. As an alternative, high-temperature-resistant fiber materials with higher melting points than the usual nylon fabrics are to be used. The use of sacrificial materials, however, leads to a greater layer thickness and to a higher weight of the airbag fabric. The use of special high-temperature-resistant plastics is not cost-effective.

From U.S. Pat. No. 5,599,585 there is known the production of metallized fabrics by the employment of plasma coating technology. Document JP-A-05338092 describes the plasma treatment of airbag fabrics in order to improve the adherence of a thermoplastic elastomer that is subsequently applied onto the treated fabric.

There is still a need for airbags that can be manufactured inexpensively and that have improved heat resistance.

BRIEF SUMMARY OF THE INVENTION

According to the invention, an airbag for a restraint system in motor vehicles comprises a wall made of fabric. One surface of the fabric is subjected to a plasma treatment in order to increase the heat resistance of the fabric. The plasma treatment is preferably a metallization, and the metal layer formed by the metallization can be between 40 nm and 10 $\mu$m thick. Depending on the application purpose, the plasma treatment can also be a fluorination.

The airbag according to the invention preferably has an inner surface that delimits a gas volume, the plasma-treated surface of the airbag fabric facing the gas volume in the inflated state of the airbag.

Preferably, at least parts of the airbag wall are made of the fabric that is provided with the plasma-treated surface. However, the wall can also be completely made of the plasma-treated fabric.

Moreover, the invention also encompasses a device for the protection of vehicle occupants by means of the airbag according to the invention.

The invention also provides a method of producing an airbag for a restraint system in motor vehicles, comprising the following steps: preparing at least one width of fabric; plasma treatment of a surface of the at least one fabric width in a microwave reactor or in a high-frequency reactor in order to increase the heat resistance of the fabric, as well as cutting and joining the fabric widths in a known manner so as to form the airbag according to the invention.

The plasma treatment is preferably carried out in a microwave reactor at 2.4 to 2.6 GHz. Moreover, a high-frequency reactor can be used for the plasma treatment, the treatment being carried out under vacuum at 13 to 14 MHz. Special preference is given to carrying out the plasma treatment in the generally known roll-to-roll process, a continuous process that allows an especially cost-effective production.

Finally, the invention also proposes a method of inflating an airbag with a fabric having a surface that has been at least partially treated in a plasma. The airbag has its inner surface plasma-treated in order to increase its heat resistance, when hot inflation gas impinges on the plasma-treated inner surface.

The plasma-treated fabrics exhibit heat resistance that is two to ten times higher than that of the conventionally coated fabrics. Due to the extremely small layer thicknesses of the coating, it is ensured that the airbag can be folded without any problems. The crease resistance of the folded airbag in the airbag module is also sufficient over a period of time corresponding to the service life of the vehicle. Finally, the plasma coating does not cause a change in the pre-selected air permeability of the fabric.

Additional features and advantages of the invention will be apparent from the following description of an embodiment.

DETAILED DESCRIPTION OF THE PREFERRED EMBODIMENT

Figure 1:
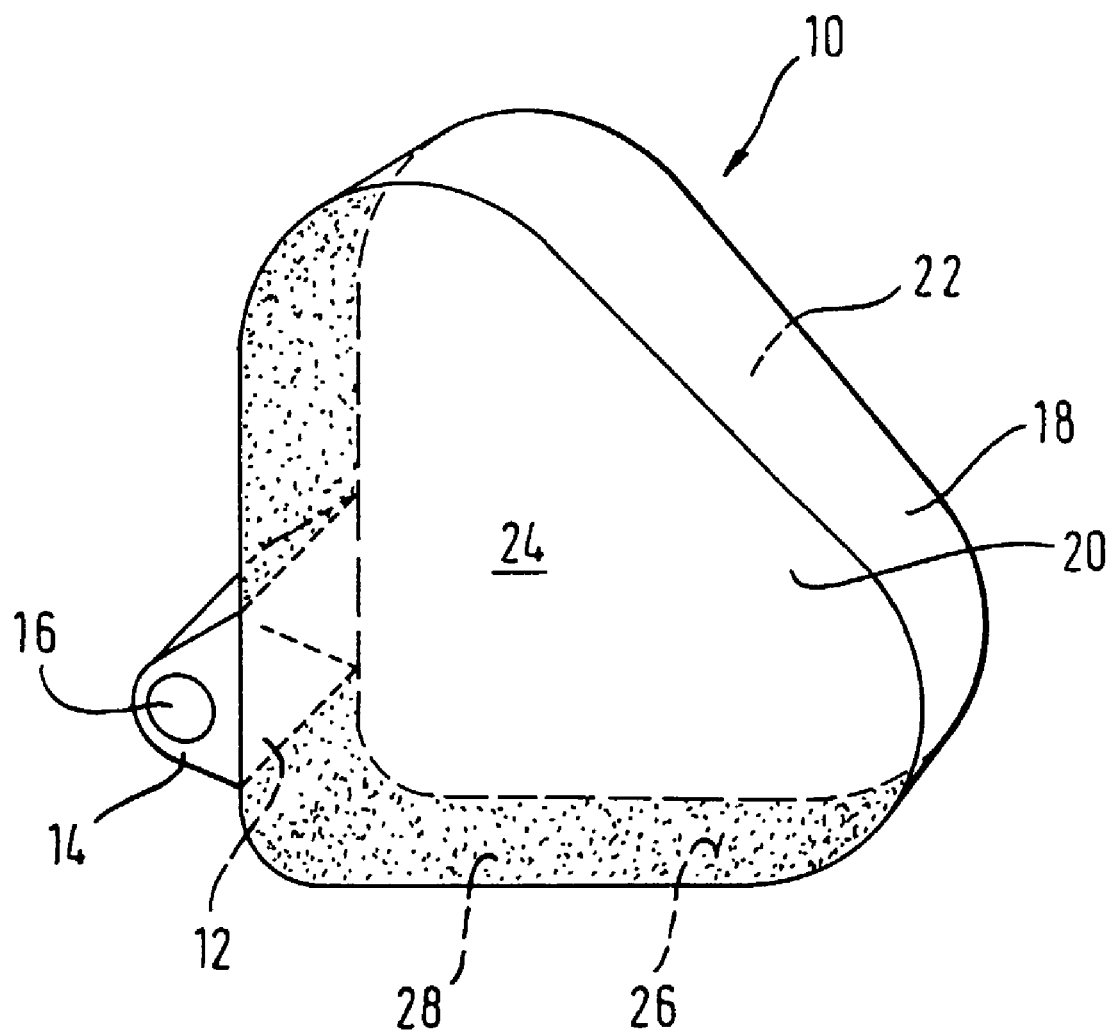
FIG. 1 is a schematic perspective view of an airbag in the inflated state.

The airbag 10 of a restraint system for motor vehicles shown in the inflated state in FIG. 1 is connected with its mouthpiece 12 to the housing 14 of a gas generator 16. The airbag 10 shown here consists of a middle fabric part 18 and of two side fabric parts 20, 22, which together form the wall 24. However, other cuts can also be used. In the embodiment shown here, the surface 26 of the fabric part 18 facing the gas volume flowing out of the gas generator 16 into the airbag has been treated in a plasma on the inside of the airbag in order to increase its heat resistance. Moreover, the surfaces of the side fabric parts 20 and 22 facing the inside of the airbag can also be plasma-treated. It is also possible to treat only those areas of the fabric parts 18, 20 and 22 in the plasma that are very exposed to the hot gases flowing out of the gas generator 16. In general, these will be the areas of the airbag fabric that are adjacent to the mouthpiece 12 as well as the fabric parts opposite from the mouthpiece 12 in the flow direction of the hot gases.

In a particularly preferred embodiment, the plasma treatment is a metallization so that a metal layer 28 is formed on the surface 26 which has a thickness between 40 nm and 10 $\mu$m. In another embodiment of the invention, the surface 26 is fluorinated.

In order to manufacture the airbag according to the invention, fabric widths are prepared from suitable polyamide or polyester fabrics with a preset air permeability. These fabric widths are first treated in a plasma generated by a microwave reactor or by a high-frequency reactor. The plasma treatment is preferably carried out by means of the already known roll-to-roll method which, as a continuous process, allows fast and cost-effective production. The plasma is generated in the microwave reactor at, for example, 2.4 to 2.6 GHz under the controlled feed of up to three gases so as to set the type and thickness of the coating. The coating in the high-frequency reactor can be carried out with the generation of a low-pressure plasma at 13 to 14 MHz under vacuum by means of microwave sputtering or electron beam vapor-deposition. Preferably, the plasma treatment serves to apply a metallic protective layer onto the surfaces of the widths of fabric. The layer thickness preferably lies in the range from 40 nm to 10 μm.

The metallic protective layer offers an effective protection against the effect of hot gases. Thus, with a polyamide fabric of the type 470/F72dtex. it was found that, depending on the coating thickness, the fabric, which was metallized by the plasma treatment, had a heat-resistance that was two to ten times higher than untreated fabric of the same type. For the experiment set-up, a defined surface of each fabric was exposed to a metal ball weighing 33 grams and heated to 850° C. [1562° F.] with a diameter of 20 mm, and the time was measured until the fabric melted through.

Another advantage of the metallized protective layer on the airbag fabric generated by the plasma treatment lies in the shielding effect against high-frequency electromagnetic fields. As a result, the airbag, which is folded over the gas generator, can additionally shield the sensitive ignition mechanism of the gas generator and the vehicle electronics situated underneath. Thus, for example, attenuation levels of about 70 dB between 300 and 1000 MHz can be achieved at a coating thickness of about 400 nm.

Airbag fabrics that are exclusively supposed to have improved heat resistance can also be fluorinated by means of a plasma treatment. In this case, a brief treatment is carried out in the above-described reactor using a $C_2F_6$/Ar plasma. The conditions of the plasma treatment, in particular pressure, temperature, time and composition of the plasma, that are suitable for achieving the desired degree of fluorination or the desired coating thickness can be ascertained in appropriate preliminary experiments.

The fabric parts treated with the process described above are then cut in the usual manner and joined together to form the airbag according to the invention.

The airbag manufactured in this manner has an improved resistance to hot gases. Due to the thinness of the coating, however, the increase in weight of the airbag fabric is only insignificant. Consequently, the essential advantages of uncoated airbags, especially the small space requirement in the folded state, are retained. The crease-resistance of the airbags made of the plasma-treated fabric sections is sufficient over a period of time corresponding to the service life of the vehicle. Since the coating of the fabric parts can be carried out in a continuous process, particularly heat-resistant airbags can be manufactured cost-effectively.

What is claimed is:

1. An air bag for a restraint system in motor vehicles, said air bag comprising a wall made of fabric, the wall having an inner surface which faces a gas volume in an inflated state of the air bag and an outer surface which faces in a direction opposite the inner surface, the improvement consisting in that the inner surface of said fabric is subjected to a heat resistant treatment, the heat resistant treatment being a plasma treatment selected from a group including metallization and fluorination, the plasma treated inner surface being exposed to the gas volume in the inflated state of the air bag.

2. The air bag according to claim 1, wherein a metal layer formed by said metallization is between 40 nm and 10 μm thick.

3. The air bag according to claim 1, wherein said wall comprises a plurality of fabric pieces joined together and at least one of said plurality of fabric pieces being provided with said plasma-treated surface.

4. The airbag according to claim 1, wherein said wall consists completely of said fabric which is provided with said plasma-treated surface.

5. A method of producing an air bag for a restraint system in vehicles, the method comprising the following steps:
   providing at least one width of fabric;
   treating a surface of said at least one fabric width with a heat resistant plasma treatment selected from a group including metallization and fluorination in one of a microwave reactor and a high-frequency reactor; and
   cutting said at least one fabric width into several fabric widths and joining said fabric widths so as to form an air bag with the plasma treated surface of the fabric widths being exposed to a gas volume in an inflated state of the air bag.

6. The method according to claim 5, wherein said plasma treatment is carried out in a microwave reactor at 2.4 to 2.6 GHz.

7. The method according to claim 5, wherein said plasma treatment is carried out under vacuum at 13 to 14 MHz.

8. The method according to claim 5, wherein said plasma treatment is carried out in a roll-to-roll process.

9. A method of inflating an air bag of a restraint system for vehicle occupants, the method comprising the steps of:
   generating a mixture of hot gases from a gas generator, and
   passing said hot gas mixture into said air bag,
   wherein said air bag has a heat resistant plasma treatment selected from a group including metallization and fluorination on an inner surface, and wherein said hot gas mixture impinges on said plasma-treated inner surface.

10. The airbag according to claim 1 wherein a metal protective layer is formed by said metallization to protect said inner surface of said fabric from the hot gas of the gas volume.

* * * * *